US009030469B2

(12) United States Patent
Huang et al.

(10) Patent No.: US 9,030,469 B2
(45) Date of Patent: May 12, 2015

(54) METHOD FOR GENERATING DEPTH MAPS FROM MONOCULAR IMAGES AND SYSTEMS USING THE SAME (75) Inventors: Wei-Jia Huang, Nantou County (TW); Kai-Che Liu, Kaohsiung (TW); Ludovic Angot, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 461 days.

(21) Appl. No.: 13/509,962

(22) PCT Filed: Nov. 18, 2009

(86) PCT No.: PCT/CN2009/075007
§ 371 (c)(1),
(2), (4) Date: May 15, 2012

(87) PCT Pub. No.: WO2011/060579
PCT Pub. Date: May 26, 2011

(65) Prior Publication Data
US 2013/0162629 A1 Jun. 27, 2013

(51) Int. Cl.
*H04N 13/00* (2006.01)
*G06T 7/00* (2006.01)
*H04N 13/02* (2006.01)

(52) U.S. Cl.
CPC .......... *G06T 7/0071* (2013.01); *H04N 13/0022* (2013.01); *H04N 13/026* (2013.01); *G06T 2207/10016* (2013.01); *G06T 2207/20028* (2013.01)

(58) Field of Classification Search
None
See application file for complete search history.

(56) References Cited

U.S. PATENT DOCUMENTS 8,447,141 B2 * 5/2013 Barenbrug .................... 382/298
2007/0024614 A1 * 2/2007 Tam et al. .................... 345/419
(Continued)

FOREIGN PATENT DOCUMENTS

| CN | 1466737 A | 1/2004 |
|---|---|---|
| CN | 1739119 A | 2/2006 |
| CN | 101542529 A | 9/2009 |

OTHER PUBLICATIONS

Cheng, Chao-Chung, et al. "A block-based 2D-to-3D conversion system with bilateral filter." Consumer Electronics, 2009. ICCE'09. Digest of Technical Papers International Conference on. IEEE, Conference Date (Jan. 2009).*

(Continued)

*Primary Examiner* — Kee M Tung
*Assistant Examiner* — Ryan M Gray
(74) *Attorney, Agent, or Firm* — Muncy, Geissler, Olds & Lowe, P.C.

(57) ABSTRACT

Methods for generating depth maps from monocular still image or monocular video and systems using the same are provided. First, an initial depth map is estimated or arbitrary defined. For video inputs, motion information can be used, for still image the initial background can be arbitrary set by default, chosen by the user or can be estimated. Estimation of the initial depth map can be based on a contrast map or a blur map. The initial depth map defines initial depth values for the respective pixels of the monocular image or monocular motion picture frames. The respective pixels of the original image or video frame data are mapped to the initial depth map according to positions of the pixels, in order to obtain corresponding initial depth values. An image data space of the image is subdivided into a plurality of sub-image spaces, and the initial depth value of each of the pixels of the image is filtered according to the initial depth values of the pixels located in the same sub-image space, in order to obtain depth information for the pixels.

26 Claims, 6 Drawing Sheets

(56) References Cited

U.S. PATENT DOCUMENTS

| | | | |
|---|---|---|---|
| 2008/0031327 A1* | 2/2008 | Wang et al. | 375/240.12 |
| 2008/0150945 A1* | 6/2008 | Wang et al. | 345/427 |
| 2008/0247670 A1* | 10/2008 | Tam et al. | 382/298 |
| 2009/0116732 A1* | 5/2009 | Zhou et al. | 382/154 |
| 2010/0046837 A1* | 2/2010 | Boughorbel | 382/173 |
| 2010/0073364 A1* | 3/2010 | Jung et al. | 345/419 |
| 2010/0080448 A1* | 4/2010 | Tam et al. | 382/154 |
| 2010/0092038 A1* | 4/2010 | Theodore et al. | 382/103 |
| 2011/0273529 A1* | 11/2011 | Lai et al. | 348/42 |

OTHER PUBLICATIONS

Chen, Jiawen, Sylvain Paris, and Frédo Durand. "Real-time edge-aware image processing with the bilateral grid." ACM Transactions on Graphics (TOG). vol. 26. No. 3. ACM, 2007.*

* cited by examiner

FIG. 6

METHOD FOR GENERATING DEPTH MAPS FROM MONOCULAR IMAGES AND SYSTEMS USING THE SAME

FIELD OF INVENTION

This disclosure relates generally to methods for generating depth maps and systems using the same, and, more particularly to methods for generating depth maps from images, such as monocular images or monocular motion pictures. Such depth maps are then properly converted in order to be displayed on a proper system, such as for example an autostereoscopic display.

BACKGROUND

With the advent of new stereoscopic display technologies and the immense bank of monocular images, whether they are from photos, films or videos, the need for a mean to convert such images so that they can be viewed on stereoscopic displays is obvious. Various methods have been proposed to perform such a conversion. In the patent, US2008/0260288 "Creating a Depth Map", the conversion is based on an image segmentation and the assignment of depth information based on the relative size of the segmented objects. There exists several methods based on the existence of motion in a sequence of images, such as the ones disclosed in the patents U.S. Pat. No. 5,748,199 "Method and apparatus for converting a two dimensional motion picture into a three dimensional motion picture" and U.S. Pat. No. 7,489,812 "Conversion and encoding techniques".

SUMMARY OF INVENTION

Methods for generating depth maps and systems using the same are provided.

In this disclosure and unless otherwise specified, the term image relates to a monocular image obtained from a monocular image or from frames captured from a motion picture.

In an exemplary embodiment of a method for generating depth maps, an initial depth map is estimated or selected, and image data is obtained from a monocular image or video comprising a plurality of pixels. Every pixel of the image is mapped to the initial depth map according to the positions of the pixels, in order to obtain corresponding initial depth values. The initial depth map thus defines initial depth values for the pixels of the image. An image data space of the image is subdivided into a plurality of sub-image spaces, and the initial depth value of each of the pixels of the image data is filtered according to the initial depth values of the pixels located in the same sub-image space, in order to obtain depth information for the pixels while preserving the fine details of the monocular image.

An exemplary embodiment of a depth map generation system includes a storage unit and a processing unit. The storage unit contains an initial depth map and one or several images comprising a plurality of pixels. The initial depth map defines initial depth values for the respective pixels of the image. The processing unit maps each of the pixels of the image to the corresponding gray scale value of the pixels of the initial depth map, in order to obtain initial depth values of the pixels of the image. The processing unit subdivides an image data space of the image into a plurality of sub-image spaces, and filters the initial depth value of each of the pixels of the image according to the initial depth values of the pixels located in the same sub-image space, in order to obtain depth information for the pixels.

In another exemplary embodiment of a method for generating depth maps, an initial depth map is obtained, and image comprising a plurality of the pixels is obtained. The initial depth map defines initial depth values for the respective pixels of the image. Each of the pixels of the image is mapped to the initial depth map according to positions of the pixels, in order to obtain corresponding initial depth values. The initial depth value of each of the pixels of the image is filtered using a bilateral filter, in order to obtain depth information for the pixels while preserving the original image details.

An exemplary embodiment of a depth map generation system includes a storage unit and a processing unit. The storage unit includes an initial depth map and image comprising a plurality of pixels. The initial depth map defines initial depth values for the respective pixels of the image data. The processing unit maps each of the pixels of the image to the initial depth map according to positions of the pixels, in order to obtain corresponding initial depth values. The processing unit filters the initial depth value of each of the pixels of the image data using a bilateral filter, in order to obtain depth information for the pixels.

BRIEF DESCRIPTION OF THE DRAWINGS

The disclosure will be better understood by referring to the following detailed description with reference to the accompanying drawings, wherein.

DETAILED DESCRIPTION

Methods for generating depth maps and systems using the same are provided.

Figure 1:
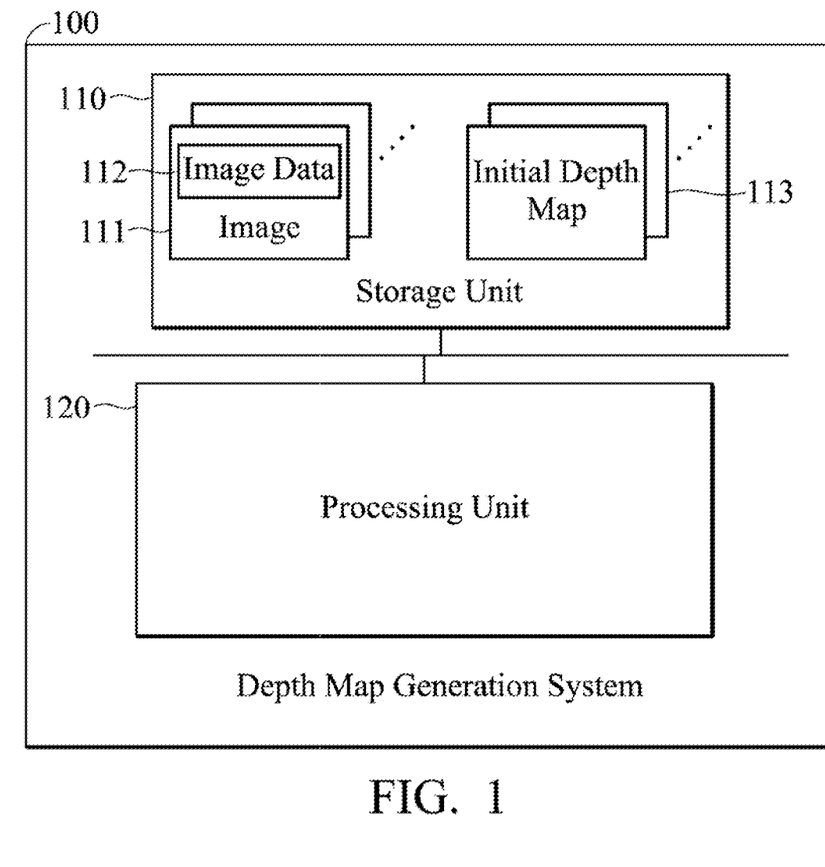
FIG. 1 is a schematic diagram illustrating an exemplary embodiment of a depth map generation system of the disclosure.
Figure 2A:
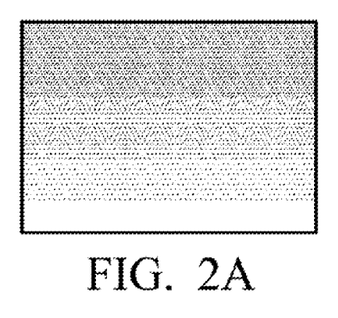
FIGS. 2A~2F are pictures illustrating an exemplary embodiment of examples of initial depth maps of the disclosure.
Figure 2B:
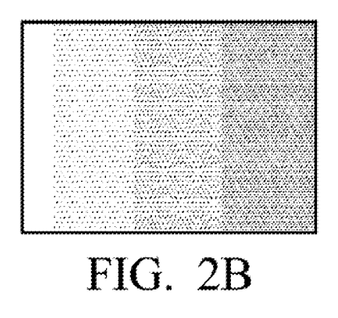
Figure 2C:
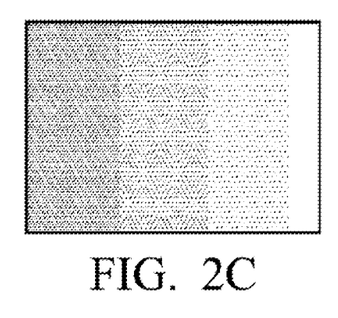
Figure 2D:
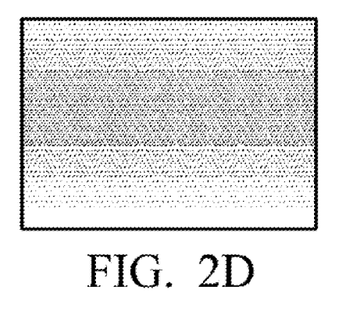
Figure 2E:
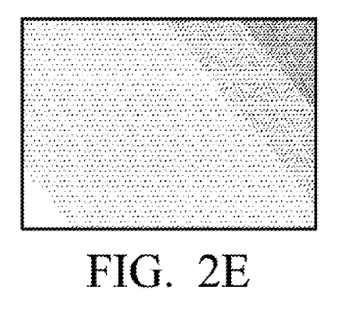
Figure 2F:
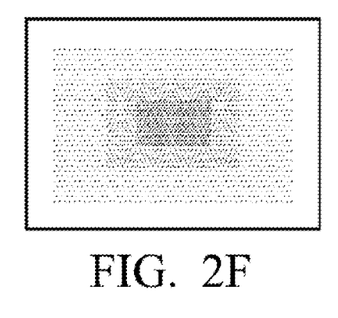

FIG. 1 is a schematic diagram illustrating an exemplary embodiment of a depth map generation system of the disclosure. The depth map generation system 100 can be used in an electronic device, such as a computer system, a display device, a receiving device, a playback device, a capturing device such as one implemented in a mobile phone and other relevant devices containing or not a display.

Figure 3A:
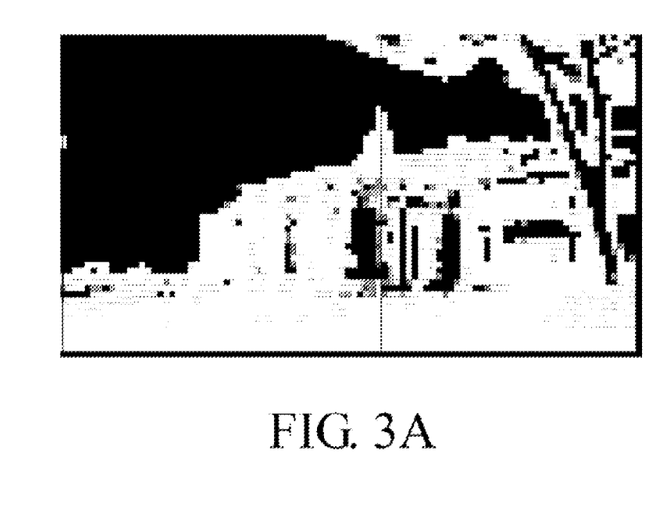
FIGS. 3A and 3B are pictures illustrating an exemplary embodiment of yet other examples of initial depth maps of the disclosure
Figure 3B:
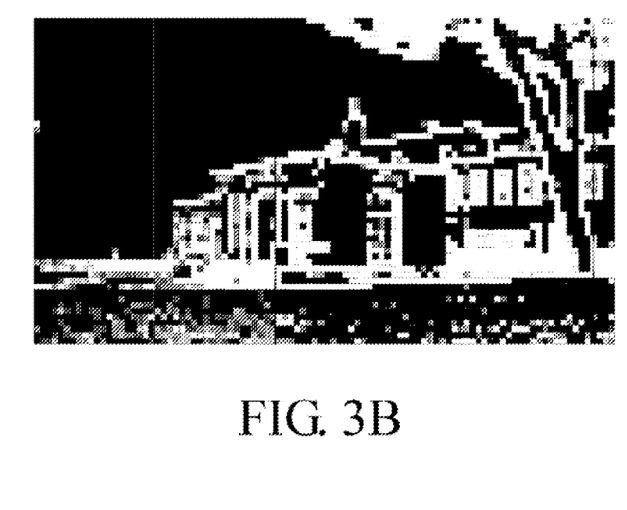
Figure 4:
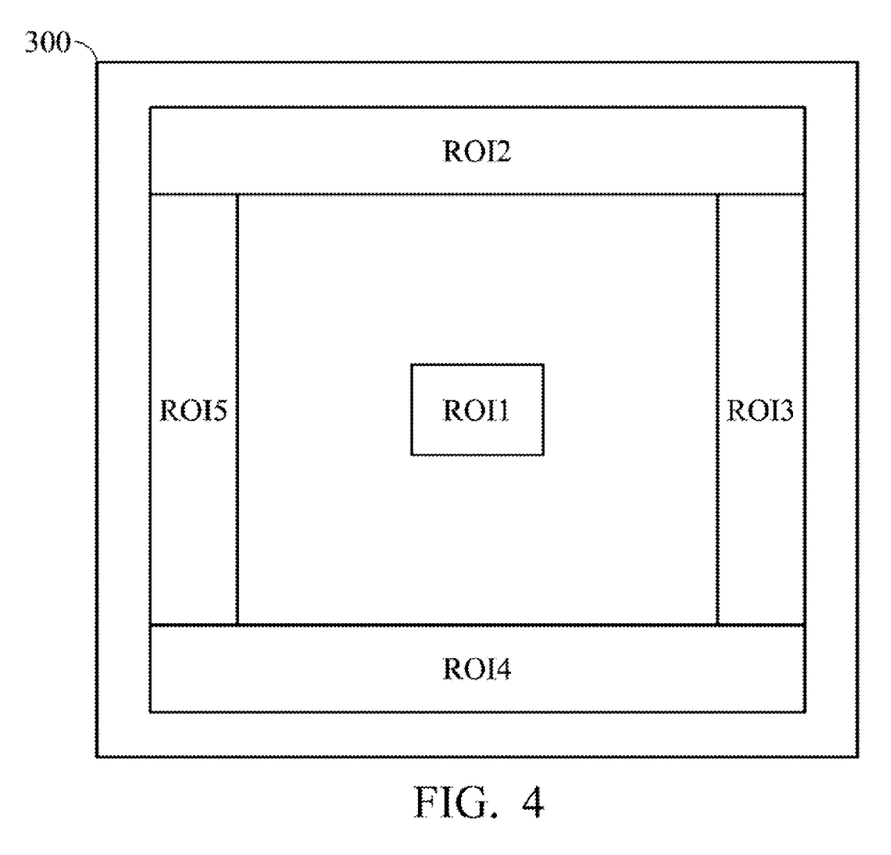
FIG. 4 is a schematic diagram illustrating an exemplary embodiment of a method to estimate an initial depth map of the disclosure.

The depth map generation system 100 comprises a storage unit 110 and a processing unit 120. The storage unit 110 comprises at least one image 111 and at least one corresponding initial depth map 113. The single or set of images 111 may be obtained from a monocular still image or a monocular motion picture. The initial depth map 113 defines initial depth values for the respective pixels of the single or set of images 111. FIGS. 2A~2F are schematic diagrams illustrating an exemplary embodiment of examples of initial depth maps of the disclosure. As shown in FIGS. 2A~2F, each initial depth map may be composed of a plurality of the pixels, and each of the pixels has a corresponding initial depth values. It is noted that, in FIGS. 2A~2F, the initial depth values is represented by a gray-level color between white and black, and each gray level corresponds to a specific depth value, wherein the black color represents the deepest depth, and the white color the shallowest depth. It is understood that the initial depth maps in FIGS. 2A~2F are only examples of the application, and the present disclosure is not limited thereto. The initial depth map 113 can be predefined or generated according to the single or set of images 111. In some exemplary embodiments, the initial depth map 113 can be generated according to contrast, intensity, blur information, or texture gradient of the respective pixels of the single or set of images 111. FIG. 3A is an example of an initial depth map based on the measurement of a blur metric, wherein the initial depth map is obtained by mean of computing a blur metric within a sub-window sliding over the single image 111 or one of the image from the set of images 111. FIG. 3B is an example based on the measurement of a contrast. In some exemplary embodiments, when the set of images 111 is a video, a motion vector for each pixel of every images 111, except the first of a time sequence constituting a scene of a motion picture, can be calculated according to the image data 112 (several image frames), and the initial depth map 113 is constructed according to the motion vectors of the respective pixels of the set of images 111, wherein a specific value of the motion vector can be mapped to a specific initial depth value. Further, in some exemplary embodiments, one of the initial depth maps can be selected according to the motion vectors of the respective pixels of a subset of images taken from the set of images 111. In these exemplary embodiments, each image of the subset of images may comprise at least one Region Of Interest (ROI). A corresponding ROI is defined in the initial depth maps to be estimated, the initial depth map corresponding to the subset of images. A corresponding tag is assigned to the ROI according to the amount of motion within said ROI; which tag represents a deep or a shallow depth, namely near or far. For example, an initial depth map 300 defines 5 ROIs, ROI1 to ROI5, as shown in FIG. 4, wherein each has a near or far tag. The motion vectors of respective pixels in the ROI of the subset of images taken from the set of images 111 are calculated and averaged. The value of the average motion vector of the ROI can be compared to a threshold to obtain a tag (near/far) for the ROI of the subset of images taken from the set of images 111, and a specific initial depth map can then be created according to the ROI tag of an image of the set of images 111, wherein the ROI tag of the specific depth model conforms to the ROI tag of the an image of the set of images 111. It is understood that, when several ROIs are defined in the set of images 111 and the initial depth map 113, a combination of the ROI tags can be used to select the most appropriate initial depth map, for example, by selecting an element in a Look-Up Table (LUT), not shown. It is also understood that, in some exemplary embodiments, each ROI can also be defined as a plurality of points constituting a grids on which motion vectors can be calculated to accelerate the evaluation of motion. The processing unit 120 performs the method for generating depth maps of the disclosure, which will be discussed further in the following paragraphs.

Figure 5:
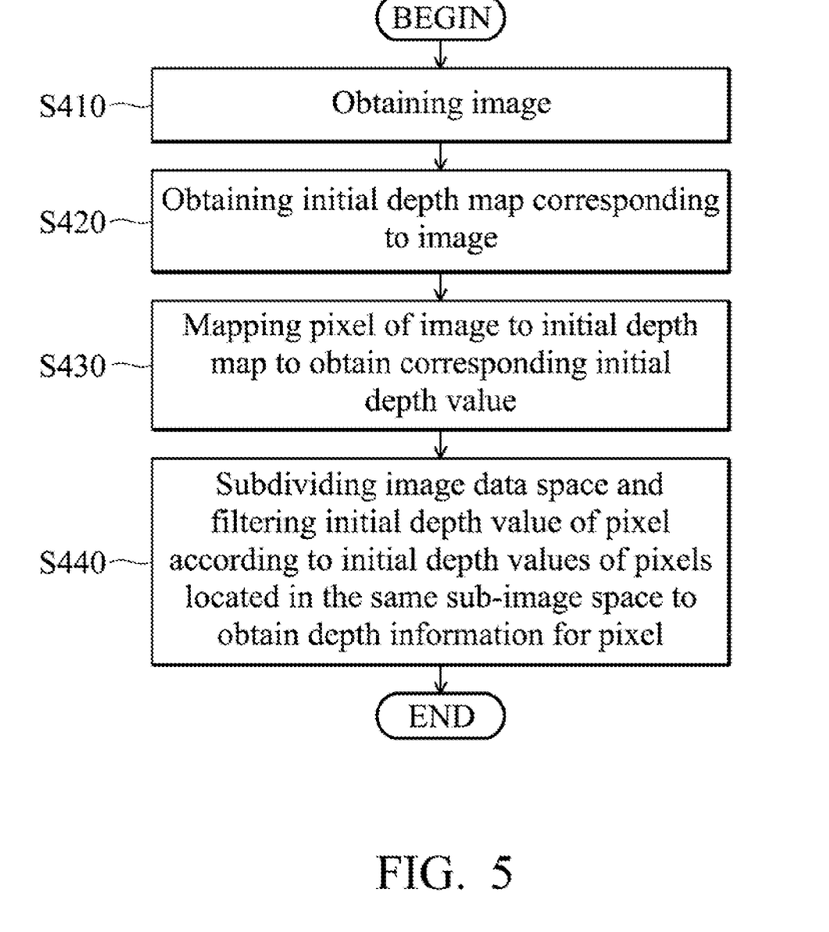
FIG. 5 is a flowchart of an exemplary embodiment of a method for generating depth maps of the disclosure.

FIG. 5 is a flowchart of an exemplary embodiment of a method for generating depth maps of the disclosure. The method for generating depth maps can be used for an electronic device, such as a computer system, a display device, a receiving device, a playback device, and others.

In step S410, image comprising a plurality of pixels is obtained. The image may be obtained for example from a still image or a motion picture. In step S420, an initial depth map is obtained. The initial depth map defines initial depth values for the respective pixels of the image. Similarly, in some exemplary embodiments, the initial depth map can be selected from a plurality of candidate initial depth maps or generated according to the contrast, intensity, atmospheric perspective, blur information, or texture gradient of the respective pixels of the image. In some exemplary embodiments, motion vectors corresponding to at least one ROI defined in the video frames can be calculated, and the values of the motion vectors can be used to directly construct the initial depth map, or select the initial depth map from a plurality of initial depth map candidates. Related details of selection or construction of the initial depth map have been disclosed above. In step S430, each of the pixels of the image is mapped to the initial depth map according to positions of the pixels, in order to obtain corresponding initial depth values. In step S440, the image data space of the image is subdivided into a plurality of sub-image spaces, and the initial depth value of each of the pixels of the image is filtered according to the initial depth values of the pixels located in the same sub-image space, in order to obtain depth information for the pixels.

It is noted that, in some exemplary embodiments, step S440 can be performed by filtering the initial depth values of the respective pixels of the image using a bilateral filter, in order to obtain depth information for the image or video frames pixels. It is noted that, the color values of the pixels are replaced by the initial depth values, and input to the bilateral filter for filtering. The bilateral filter might be well known to those skilled in the art, and thus a detailed description is omitted, reference can be made to "Real-time Edge-Aware Image Processing with the Bilateral Grid"; Jiawen Chen, Sylvain Paris, and Frédo Durand; ACM Transactions on Graphics (Proceedings of the ACM SIGGRAPH '07 conference). The filtering process of the initial depth values of the respective pixels of the image is accelerated using a bilateral grid method. First, each of the pixels of the image is mapped to at least one 3D grid based on pixel intensity and possibly can be mapped to other 3D grids based on other available pixel information. In the mapping process, the 2D coordinates of each pixel of the image and their intensity are mapped to a 3D coordinates according to a mapping function:

$$\begin{cases} x = \lfloor u/s \rfloor \\ y = \lfloor v/s \rfloor \\ z = \lfloor I(u, v)/r \rfloor \end{cases}$$

where r and s are two adjustable parameters relating respectively the spatial range and intensity range of each pixels of the initial monocular image to the number of cells in the grid, (u, v) are the 2D coordinates of each pixel of the image, I(u, v) is the intensity of the pixel (u, v), and (x, y, z) are the in the 3D space defined by the bilateral grid. After each pixel is mapped to a 3D grid, an average depth value for each cell is calculated according to the initial depth values of the respective pixels in each cell of the grid. It is understood that, in some exemplary embodiments, the average depth value of each cell can be further filtered using a Low Pass Filter (LPF). Additionally, in some exemplary embodiments, the average depth value of each cell can be further smoothed according to surrounding cells using a Gaussian filter. Finally, the initial depth value of each of the pixels of the image is replaced by the average depth value of the cell where the pixel is located, in order to obtain the depth information for the pixels.

Figure 6:
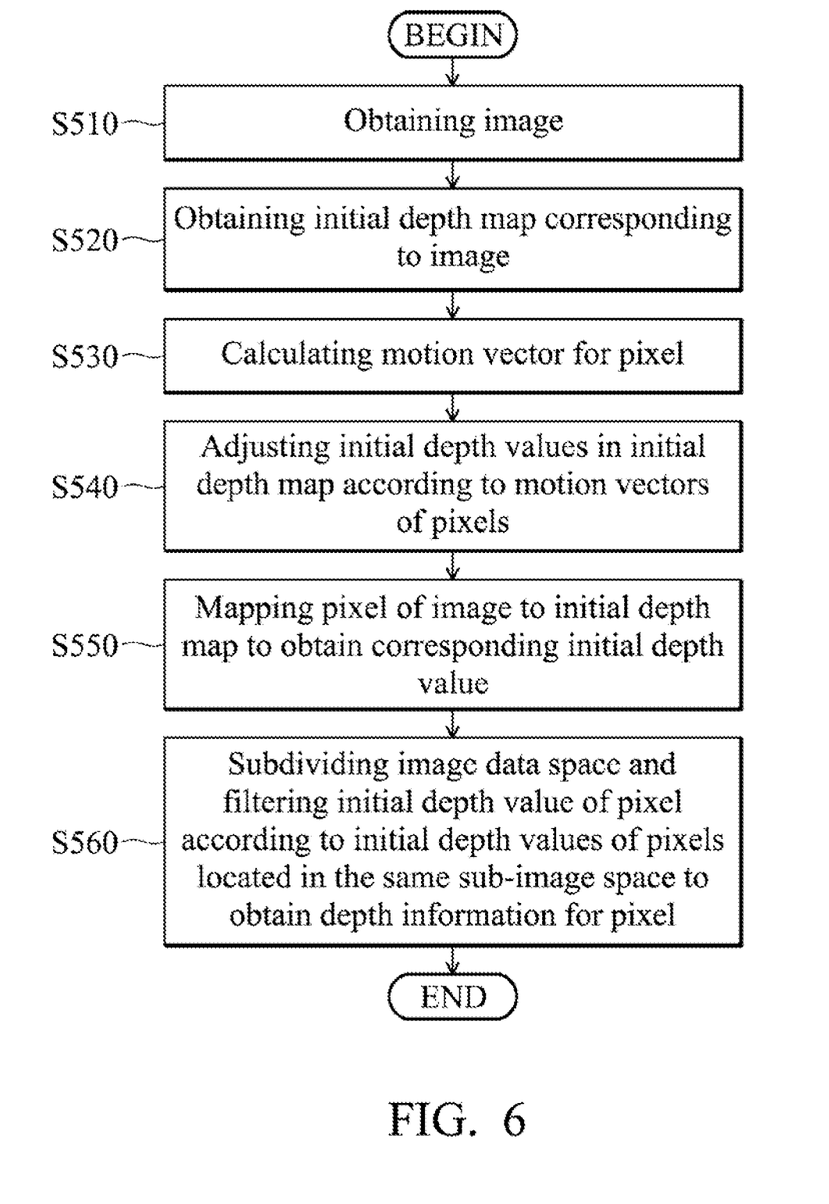
FIG. 6 is a flowchart of another exemplary embodiment of a method for generating depth maps from a series of images such as frames extracted from a motion picture.

FIG. 6 is a flowchart of another exemplary embodiment of a method for generating depth maps of the disclosure. The method for generating depth maps can be used for an electronic device, such as a computer system, a display device, a receiving device, a playback device, and others. In this exemplary embodiment, motion parallax in a sequence of images can be used to adjust the initial depth values in the initial depth map.

In step S510, images comprising a plurality of pixels are obtained. The images may be obtained from a monocular motion picture. In step S520, one or several initial depth maps are obtained corresponding to at least one image. The initial depth maps may define initial depth values for the respective pixels of the images. Similarly, in some exemplary embodiments, one or several initial depth maps can be selected from a plurality of candidate initial depth maps or generated according to the contrast, intensity, blur information, or texture gradient of the respective pixels of the images. In some exemplary embodiments, motion vectors corresponding to ROIs defined in the images can be calculated, and the values of the motion vectors can be used to directly construct the initial depth maps, or select the initial depth maps from a plurality of candidate initial depth maps. Examples of selected depth map are found in FIG. 2A to 2F and calculated depth maps are shown on FIGS. 3A and 3B. the process of selecting one of the depth map shown on FIG. 2A to 2F is done by evaluating a motion vector in the images ROI. In step S530, a motion vector for each pixel of the image is calculated according to the images data (several image frames). It is understood that, in some exemplary embodiments, the motion vector for each pixel can be calculated using an optical flow method, but is not limited thereto. In some exemplary embodiments, the image is segmented, for example, using a method based on a mean shift filter. An average motion vector for each segment is calculated according to the motion vectors of the respective pixels in the segment, and the average motion vector is assigned to each pixel in the segment. It is understood that, in some exemplary embodiments, the average motion vector for the same segment in different image frames can be further averaged. Thereafter, in step S540, the initial depth value of each of the pixels in the initial depth map is adjusted according to the motion vector for the respective pixel. In some exemplary embodiments, the initial depth value of each of the pixels in the initial depth map is adjusted using the following function:

$$D_r(x, y) = \begin{cases} \alpha \times \min(D_m(x, y), M_{max}) + (1-\alpha) \times D_b(x, y), & \text{if } D_m(x, y) \geq T_m \\ D_b(x, y), & \text{otherwise} \end{cases}$$

wherein $$\alpha = \frac{\min(D_m(x, y), M_{max})}{M_{max}},$$

$D_m(x, y)$ is the direct proportion to the value of the motion vector of the pixel (x, y) of the image data, $D_b(x, y)$ is the original initial depth value of the pixel (x, y) in the initial depth map, $D_r(x, y)$ is the adjusted initial depth values of the pixel (x, y), $M_{max}$ is a preset maximum motion vector, and $T_m$ is a preset threshold. It is understood that, the function is an example, and the present disclosure is not limited thereto. Any function that can integrate the initial depth values in the initial depth map and the motion vectors in the image data can be applied in the present disclosure. After the initial depth values in the initial depth map are adjusted, in step S550, each of the pixels of the image is mapped to the initial depth map according to positions of the pixels, in order to obtain corresponding initial depth values. In step S560, the image data space is subdivided into a plurality of sub-images, and the initial depth value of each of the pixels of the image is filtered according to the initial depth values of the pixels located in the same sub-image, in order to obtain depth information for the pixels.

Similarly, in some exemplary embodiments, step S560 can be performed by filtering the initial depth values of each of the pixels of the image using a bilateral filter, in order to obtain depth information for the pixels. It is noted that, the color values of the pixels are replaced by the initial depth values taken from the initial depth map, and input to the bilateral filter for filtering. In some exemplary embodiments, the filtering process of the initial depth values of each of the pixels of the image can be accelerated using a bilateral grid method. First, each of the pixels of the image is mapped to at least one 3D grid based on pixel intensity and possibly can be mapped to other 3D grids based on other available pixel information. After each pixel is mapped to a 3D grid, an average depth value for each cell is calculated according to the initial depth values of the respective pixels in the cell. It is understood that, in some exemplary embodiments, the average depth value of each cell can be further filtered using an LPF. Additionally, in some exemplary embodiments, the average depth value of each cell can be further smoothed according to surrounding cells. Finally, the initial depth value of each of the pixels of the image is replaced by the average depth value of the cell where the pixel is located, in order to obtain the depth information for the pixels.

Therefore, the methods for generating depth maps and systems can generate depth maps from image data according to various initial depth maps.

Methods for generating depth maps and systems, or certain aspects or portions thereof, may take the form of a program code (i.e., executable instructions) embodied in tangible media, such as floppy diskettes, CD-ROMS, hard drives, flash memories or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general purpose processor, the program code combines with the processor to provide a unique apparatus that operates analogously to application specific logic circuits.

The disclosed method can also be implemented into a hardware device, of the Very Large Scale Integration (VLSI) type or of the Field Programmable Gate Array (FPGA) type, but not limited to these types.

When implemented into any of the here above mentioned hardware device, the disclosed method can be used for real-time conversion of monocular still images such as those which could be displayed by a stereoscopic photo-frame, it can also be used for real time conversion of any monocular motion picture such as the one of the DVD type, and it can further be used for real time conversion of monocular motion picture broadcasts such as television programs. The above applications examples and their number do not constitute a limit to other applications which the present disclosure can be used for.

It is an object of disclosed embodiments to provide a method for obtaining depth maps from monocular still images or monocular motion pictures, said depth maps preserving the details of the original monocular images.

It is a further object of disclosed embodiments to provide a fast method to create depth maps from monocular still images or monocular motion pictures.

Yet another object of disclosed embodiments is to provide information on a system to implement a method to generate a depth map from a monocular image or motion picture.

While the disclosure has been described by way of example and in terms of preferred exemplary embodiments, it is to be understood that the disclosure is not limited thereto. Those who are skilled in this technology can still make various alterations and modifications without departing from the scope and spirit of this disclosure. Therefore, the scope of the present disclosure shall be defined and protected by the following claims.

The invention claimed is:

1. A method for generating depth maps, comprising of the following steps:
   obtaining image comprising a plurality of pixels;
   obtaining an initial depth map, wherein the initial depth map defines initial depth values for a plurality of pixels;
   mapping each of the pixels of the image to the initial depth map according to positions of the pixels, in order to obtain corresponding initial depth values; and
   subdividing an image data space of the image into a plurality of sub-image spaces, and filtering the initial depth value of each of the pixels of the image according to the initial depth values of the pixels located in the same sub-image space, in order to obtain depth information for the pixels,
   wherein the step of subdividing the image data space, and filtering the initial depth value of each of the pixels of the image data comprises the steps of:
   mapping each of the pixels of the image data to one or a plurality of 3D grids based on pixel intensity;
   calculating an average depth value for each cell of said one or plurality of grids according to the initial depth values of the respective pixels in the cells; and
   replacing the initial depth values of each of the pixels of the image data by the average depth value of the grid where the pixel is located, in order to obtain the depth information for the pixels.

2. The method of claim 1, further comprising smoothing the average depth value of each cell according to surrounding cells.

3. The method of claim 1, further comprising the steps of:
   calculating a motion vector for each pixel of the image according to the image data and a second image data; and
   adjusting the initial depth value of each of the pixels in the initial depth map according to the motion vector for the pixels.

4. The method of claim 3, further comprising:
   segmenting the image so that pixels are grouped into segments; and
   calculating an average motion vector for each segment according to the motion vectors of the respective pixels in each of the segment, and assigning the average motion vector to each pixel in each of the segment.

5. The method of claim 1, further comprising the steps of:
   calculating an average motion vector for at least one region of interest (ROI) in the image ; and
   selecting the initial depth map from a plurality of candidate initial depth maps according to the average motion vector of the ROI.

6. The method of claim 5, further comprising the steps of:
   determining a tag for the ROI in the image according to the average motion vector of the ROI; and
   selecting a specific candidate among several initial depth maps as the initial depth map, wherein each of the candidate initial depth maps defines the ROI and a corresponding tag representing the depth, and the tag of the ROI in the specific candidate initial depth map conforms to the tag of the ROI in the image.

7. The method of claim 1, further comprising the steps of:
   calculating a motion vector for each pixel of the image according to the image and second image ; and
   constructing the initial depth map according to the motion vectors of the respective pixels of the image.

8. The method of claim 1, further comprising generating the initial depth map according to contrast of the respective pixels of the image.

9. The method of claim 1, further comprising generating the initial depth map according to blur information of the respective pixels of the image.

10. The method of claim 1, further comprising generating the initial depth map according to texture gradient of the respective pixels of the image.

11. A method for generating depth maps, comprising:
    obtaining an initial depth map, wherein the initial depth map defines initial depth values for a plurality of pixels;
    obtaining image comprising a plurality of pixels;
    mapping each of the pixels of the image to the initial depth map according to positions of the pixels, in order to obtain corresponding initial depth values;
    filtering the initial depth values of each of the pixels of the image using a bilateral filter, in order to obtain depth information for the pixels; and
    subdividing an image data space of the image into a plurality of sub-image spaces, and filtering the initial depth value of each of the pixels of the image according to the initial depth values of the pixels located in the same sub-image space, in order to obtain depth information for the pixels,
    wherein the step of subdividing the image data space, and filtering the initial depth value of each of the pixels of the image data comprises the steps of:
    mapping each of the pixels of the image data to one or a plurality of 3D grids based on pixel intensity;
    calculating an average depth value for each cell of said one or plurality of grids according to the initial depth values of the respective pixels in the cells; and
    replacing the initial depth values of each of the pixels of the image data by the average depth value of the grid where the pixel is located, in order to obtain the depth information for the pixels.

12. The method of claim 11, further comprising accelerating the filtering process of the initial depth values of each of the pixels of the image using a bilateral grid method.

13. The method of claim 11, further comprising adjusting the initial depth values of each of the pixels in the initial depth map according to a motion vector for the pixel between a first image and a second image part of a sequence in a motion picture.

14. A depth map generation system, comprising:
    a storage unit comprising one or a plurality of images comprising a plurality of pixels, and one or a plurality of initial depth maps defining initial depth values for the respective pixels of said one or a plurality of images, said one or plurality of images is obtained from video data; and a processing unit mapping each of the pixels of the image to the initial depth map according to positions of the pixels, in order to obtain corresponding initial depth values, subdividing an image data space of the image and filtering the initial depth value of each of the pixels of the image according to the initial depth values of the pixels located in the same sub-image space, in order to obtain depth information for the pixels, wherein the processing unit further maps each of the pixels of the image data to one or a plurality of 3D cells based on pixel intensity, calculates an average depth value for each cell according to the initial depth values of the respective pixels in the cell, and replaces the initial depth value of each of the pixels of the image data by the average depth value of the cell where the pixel is located, in order to obtain the depth information for the pixels.

15. The system of claim 14, wherein the filtering operation of the processing unit consists of smoothing the average depth value of each cell according to surrounding cells.

16. The system of claim 14, wherein the storage unit further comprises video data and the processing unit further calculates a motion vector for each pixel, group of pixel or segment of the image of an image according to the image data of two correlated video frames separated in time, and adjusts the initial depth value of each of the pixels in the initial depth map according to the motion vector for the pixel, group of pixel of segment of the image.

17. The system of claim 16, wherein the processing unit further segments the pixels of the image, calculates an average motion vector for each segment according to the motion vectors of the respective pixels in the segment, and assigns the average motion vector to each pixel in the segment.

18. The system of claim 14, wherein the processing unit further calculates an average motion vector for at least one ROI (region of interest) in the image data, and selects the initial depth map from a plurality of candidate initial depth maps according to the average motion vector of the ROI.

19. The system of claim 18, wherein the processing unit further determines a tag for the ROI in the image data according to the average motion vector of the ROI, and selects a specific candidate initial depth map as the initial depth map, wherein each of the candidate initial depth maps defines the ROT and a corresponding tag representing a near side or a far side, and the tag of the ROI in the specific candidate depth model conforms to the tag of the ROI in the image data.

20. The system of claim 14, wherein the processing unit further calculates a motion vector for each pixel of the image according to the image and a second image, and constructs the initial depth map according to the motion vectors of the respective pixels of the image.

21. The system of claim 14, wherein the processing unit further generates the initial depth map according to contrast, intensity, blur information, or texture gradient of the respective pixels of the image data.

22. A depth map generation system, comprising:
a storage unit comprising an image comprising a plurality of pixels, and a initial depth map defining initial depth values for the respective pixels;

a processing unit mapping each of the pixels of the image to the initial depth map according to positions of the pixels, in order to obtain corresponding initial depth values, and filtering the initial depth values of each of the pixels of the image data using a bilateral filter, in order to obtain depth information for the pixels, wherein the processing unit further subdivides an image data space of the image and filtering the initial depth value of each of the pixels of the image according to the initial depth values of the pixels located in the same sub-image space, in order to obtain depth information for the pixels, wherein the processing unit further maps each of the pixels of the image data to one or a plurality of 3D cells based on pixel intensity, calculates an average depth value for each cell according to the initial depth values of the respective pixels in the cell, and replaces the initial depth value of each of the pixels of the image data by the average depth value of the cell where the pixel is located, in order to obtain the depth information for the pixels.

23. The system of claim 22, wherein the processing unit further accelerates the filtering process of the initial depth values of each of the pixels of the image data using a bilateral grid method.

24. The system of claim 22, wherein the processing unit further adjusts the initial depth value of each of the pixels in the initial depth map according to a motion vector for the pixel between the image data and second image data.

25. A non-transitory machine-readable storage medium comprising a computer program, which, when executed, causes a device to perform a method for generating depth maps, wherein the method comprises:
obtaining an initial depth map, wherein the initial depth map defines initial depth values for a plurality of pixels;
obtaining image comprising a plurality of pixels;
mapping each of the pixels of the image data to the initial depth map according to positions of the pixels, in order to obtain corresponding initial depth values; and
subdividing an image data space of the image into a plurality of sub-image spaces, and filtering the initial depth value of each of the pixels of the image data according to the initial depth values of the pixels located in the same sub-image space, in order to obtain depth information for the pixels,
wherein the step of subdividing the image data space, and filtering the initial depth value of each of the pixels of the image data comprises the steps of:
mapping each of the pixels of the image data to one or a plurality of 3D grids based on pixel intensity;
calculating an average depth value for each cell of said one or plurality of grids according to the initial depth values of the respective pixels in the cells; and
replacing the initial depth values of each of the pixels of the image data by the average depth value of the grid where the pixel is located, in order to obtain the depth information for the pixels.

26. A non-transitory machine-readable storage medium comprising a computer program, which, when executed, causes a device to perform a method for generating depth maps, wherein the method comprises:
obtaining an initial depth map, wherein the initial depth map defines initial depth values for a plurality of pixels;
obtaining image comprising a plurality of pixels;
mapping each of the pixels of the image data to the initial depth map according to positions of the pixels, in order to obtain corresponding initial depth values;
filtering the initial depth values of each of the pixels of the image data using a bilateral filter, in order to obtain depth information for the pixels; and
subdividing an image data space of the image into a plurality of sub-image spaces, and filtering the initial depth value of each of the pixels of the image according to the initial depth values of the pixels located in the same sub-image space, in order to obtain depth information for the pixels, wherein the step of subdividing the image data space, and filtering the initial depth value of each of the pixels of the image data comprises the steps of:

mapping each of the pixels of the image data to one or a plurality of 3D grids based on pixel intensity;

calculating an average depth value for each cell of said one or plurality of grids according to the initial depth values of the respective pixels in the cells; and replacing the initial depth values of each of the pixels of the image data by the average depth value of the grid where the pixel is located, in order to obtain the depth information for the pixels.

* * * * *